INVENTORS.
Ernest R. Olsen
BY Rudolph F. Flora
Clifford J. Lonnee
Attorney.

Patented Jan. 31, 1950

2,495,817

UNITED STATES PATENT OFFICE 2,495,817

CENTRIFUGAL MOLD AND LINER

Ernest R. Olsen, Rudolph F. Flora, and Clifford J. Lonnee, Muskegon, Mich., assignors to Hastings Manufacturing Company, Hastings, Mich.

Application November 18, 1946, Serial No. 710,449

3 Claims. (Cl. 22—113.5)

This invention relates to improvements in centrifugal mold and liner.

The principal objects of this invention are:

First, to provide a permanent centrifugal mold and a liner therefor which will present a continuous, substantially smooth surface against which molten metal may be centrifugally cast.

Second, to provide a centrifugal mold and liner therefor in which the liner is formed of an asbestos sheet which may be conveniently inserted to form a continuous non-bulging casting surface within the mold.

Third, to form a permanent mold with an inner surface shaped to receive a preformed sheet asbestos or heat resistant liner so that the liner conforms to the surface of the mold without bulging.

Fourth, to provide a centrifugal mold with a surface arranged to anchor and locate a liner of sheet asbestos or other heat resistant material.

Other objects and advantages pertaining to details and economies of the invention will be apparent from the following description and claims.

The drawings, of which there is one sheet, illustrate a preferred form of mold and liner therefor and several modified forms of mold walls and liners.

Figure 1:
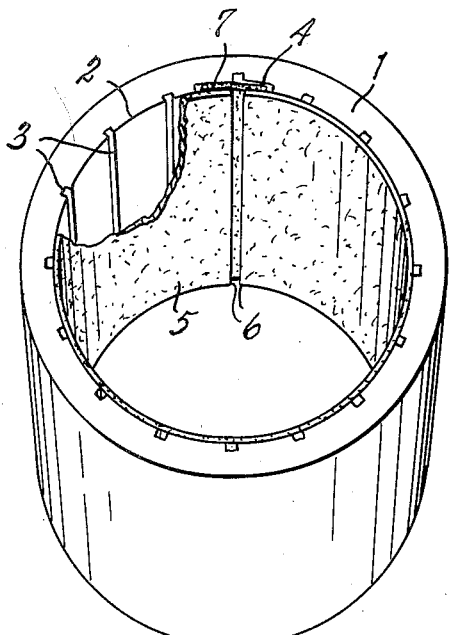
Fig. 1 is a perspective view of a preferred form of mold with a liner in place therein.

Reference is made to our copending application for Method and apparatus for making centrifugal castings, Serial No. 696,877, filed September 13, 1946, and to our copending application for Mold liner, Serial No. 710,450, filed November 18, 1946. In the first application referred to above, we have disclosed a centrifugal mold having a tubular casting cavity, the inner walls of which define longitudinally extending grooves arranged to provide ventilation from between the surface of the mold and a sheet asbestos liner which is inserted with its ends in loosely abutting non-overlapping relationship. This construction forms castings with a fine ridge extending longitudinally therealong where metal penetrates between the edges of the liner to the mold wall. This ridge is hard due to the chilling action of the wall of the mold but is not objectionable for the purpose for which the mold was first created in that the ridge is cut out in forming the gap in piston rings. Other forms of tubular centrifugal castings such as pipe and sleeves for cylinder wall liners retain their generally cylindrical shape and it is undesirable to have the hardened ridge on the outside of the casting. The present invention provides for shaping the inner surface of the permanent mold to receive the longitudinal edges of the sheet asbestos liner in such a manner that the molten metal is prevented from coming in contact with the wall of the mold and further so that the edges of the liner are so disposed as to form a substantially continuous non-bulging inner surface against which the molten metal may be cast.

In the drawings the permanent mold indicated at 1 is a permanent metal mold of generally cylindrical shape similar to the mold disclosed in the above mentioned application and having an interior surface 2 defining a series of longitudinally extending ventilating grooves 3. The inner surface 2 is further provided with an enlarged shallow groove 4 on either side of one of the ventilating grooves 3.

Disposed within the mold 1 and in closely supported abutting relationship with the inner surface 2 is a liner 5 which is preferably formed of sheet asbestos although other types of sheet heat resistant material may be substituted therefor. The width of the sheet liner 5 is slightly less than the circumference of the inner surface 2 of the mold and the longitudinal edges 6 of the sheet liner are disposed over the shallow grooves 4. A backing strip 7 of sheet asbestos is secured to one of the edges 6 by a suitable adhesive indicated at 8 and laps over the opposite edge of the liner sheet. The strip 7 is positioned in the enlarged shallow groove 4, the depth of the groove having been made to equal the thickness of the strip 7.

The liner 5 and the strip 7 are thus easily inserted in the mold by rolling the free edge of the liner within the edge to which the backing strip is attached to form a tube of smaller diameter than the inner surface of the mold. After the liner is inserted in the mold with the backing strip 7 located in the groove 4, the liner is released allowing the free edge of the liner to unroll into the position shown in Fig. 2 and with the outer surface of the liner in closely abutted supporting relationship with the mold wall. The backing strip 7 prevents metal from coming in contact with the mold wall between the longitudinal edges of the liner and the groove 4 permits the body of the liner to lie in a smooth arcuate non-bulging surface so that the contour of the casting will conform to the inner surface of the mold. The rib of metal which will be formed between the edges of the sheet 5 is protected from chill hardening by the backing strip and may be controlled in width by controlling the width of the sheet 7.

Figure 2:
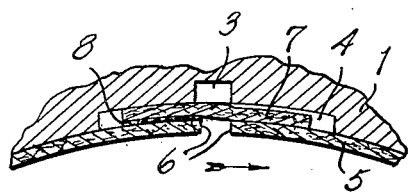
Fig. 2 is an enlarged fragmentary cross sectional view showing the joint between the edges of the liner in position in the mold.
Figure 3:
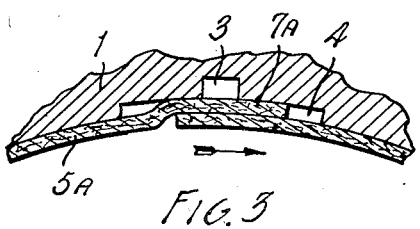
Fig. 3 is a fragmentary cross sectional view showing a modified form of liner in place in the mold shown in Figs. 1 and 2.

The modified form of liner 5A shown in Fig. 3 is outwardly offset along one edge to form an integral overlapping strip 7A which performs the same function as the strip 7 in the preferred form of the invention. The liner 5A may similarly be easily inserted in the mold and presents a substantially continuous arcuate surface to the metal cast in the mold. Both forms of the liner illustrated in Figs. 2 and 3 are preferably inserted in the mold so that the free edge trails the direction of rotation of the mold as indicated by the arrows in Figs. 2 and 3.

Figure 4:
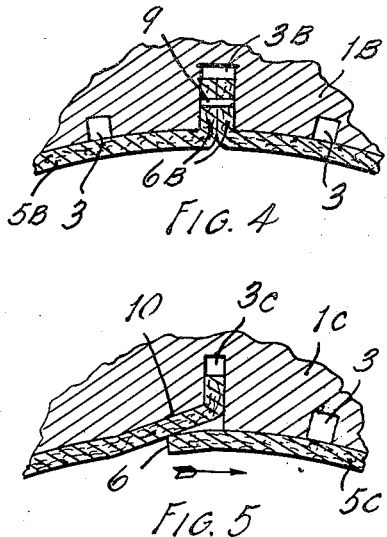
Fig. 4 is a fragmentary cross sectional view showing a modified form of mold wall with a liner in place therein.

Fig. 4 illustrates a modified form of mold IB in which the depth of one of the ventilating grooves 3B is increased and the groove is slightly widened to receive the out-turned edges 6B of the sheet asbestos liner 5B. The edges are permanently secured together by a series of staples 9. This form of mold and liner tightly holds the edges of the liner so that no metal can escape from the liner and come in contact with the wall of the mold. The folds in the edges of the liner may be made sharp so that the inner surface of the finished liner forms a substantially continuous arcuate surface against which the metal may be cast to form a smooth surface on the outside of the casting with the ridge formed by the joint in the liner reduced to a minimum.

Figure 5:
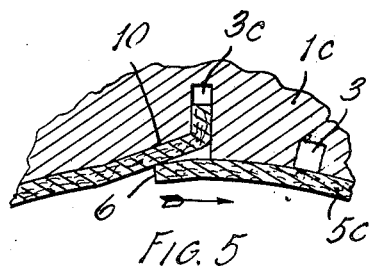
Fig. 5 is a further modified form of mold wall with a liner in place therein.

Fig. 5 illustrates a further modified form of mold IC in which the depth of one of the ventilating grooves 3C is increased and one edge of the groove is beleved off as at 10. One edge of the sheet liner 5C is folded outwardly and inserted in the groove 3C and slopes inwardly over the beveled portion to the cylindrical contour of the mold. The free edge 6 of the liner 5C freely overlaps the sloping portion of the opposite edge of the liner and should be inserted so as to trail the direction of rotation of the mold as indicated by the arrows. This form of mold and liner requires no prefabrication of the sheet liner but still effectively prevents the molten metal from coming in contact with the mold without forming a bulge in the arcuate surface of the mold.

We have described two forms of permanent mold walls and several modified forms of liners cooperable therewith so that others may reproduce the same or with such modifications thereof as may become desirable without further disclosure.

Having thus described our invention, what we claim as new and desire to secure by Letters Patent, is:

1. Casting apparatus comprising a permanent centrifugal tubular mold having longitudinally extending ventilating grooves in its inner surfaces and a circumferentially enlarged longitudinal groove, a liner of sheet heat resisting material positioned in said mold in supported facing relationship with the walls thereof, the longitudinal edges of said liner being disposed over said enlarged groove, and a backing strip positioned in said enlarged groove and lapped upon the edges of said liner and secured to only one of said edges, the thickness of said backing strip being approximately equal to the depth of said enlarged groove.

2. Casting apparatus comprising a permanent centrifugal tubular mold having a longitudinally extending groove in its inner surface, a liner of sheet heat resisting material positioned in said mold in supported facing relationship with the walls thereof, the longitudinal edges of said liner being disposed over said groove, and a backing strip positioned in said groove and lapped upon the edges of said liner and secured to only one of said edges, the thickness of said backing strip being approximately equal to the depth of said groove.

3. Casting apparatus comprising a permanent centrifugal mold having a longitudinally extending groove in its mold wall surface, a liner of sheet heat resisting material positioned in said mold in supported facing relationship with the walls thereof, a longitudinal edge of said liner being disposed over said groove, and a backing portion of sheet heat resistant material positioned in said groove and unattachably lapped upon said longitudinal edge of said liner and extending to the opposite edge of said liner whereby the mold wall surface is completely covered.

ERNEST R. OLSEN.
RUDOLPH F. FLORA.
CLIFFORD J. LONNEE.

REFERENCES CITED

The following references are of record in the file of this patent:

UNITED STATES PATENTS

| Number | Name | Date |
|---|---|---|
| 359,483 | Whitley | Mar. 16, 1887 |
| 661,143 | Grasser | Nov. 6, 1900 |
| 665,865 | Baker | Jan. 15, 1901 |
| 1,249,101 | Jacobs | Dec. 4, 1917 |
| 1,590,392 | Peters | June 29, 1926 |
| 1,595,193 | Hopkinson | Aug. 10, 1926 |

FOREIGN PATENTS

| Number | Country | Date |
|---|---|---|
| 242,405 | Great Britain | Nov. 12, 1925 |